United States Patent [19]

Smith et al.

[11] Patent Number: 4,551,808
[45] Date of Patent: Nov. 5, 1985

[54] TOOL WEAR SENSORS

[75] Inventors: Stanley K. Smith; Donald J. Rozsi, both of Fenton, Mich.

[73] Assignee: Eaton Corporation, Cleveland, Ohio

[21] Appl. No.: 480,564

[22] Filed: Mar. 30, 1983

[51] Int. Cl.⁴ ............................................. G06F 15/46
[52] U.S. Cl. .................................. 364/474; 364/475; 364/185; 364/551; 318/565
[58] Field of Search ............... 364/475, 474, 477, 184, 364/185, 550, 551; 318/563, 565; 73/104

[56] References Cited

U.S. PATENT DOCUMENTS

| | | | |
|---|---|---|---|
| 3,596,544 | 8/1971 | Pitman | 82/1 R |
| 3,694,637 | 9/1972 | Edwin et al. | 364/551 X |
| 3,715,946 | 2/1973 | Kaltenbach | 83/72 |
| 3,819,916 | 6/1974 | Watanabe | 318/565 X |
| 3,834,615 | 9/1974 | Watanabe et al. | 73/104 X |
| 3,836,834 | 9/1974 | Abbatiello | 318/563 |
| 3,975,954 | 8/1976 | Barnich | 364/550 X |
| 4,176,396 | 11/1979 | Howatt | 364/551 |
| 4,207,567 | 6/1980 | Juengel et al. | 73/104 X |
| 4,228,514 | 10/1980 | Weiss | 364/475 X |
| 4,237,408 | 12/1980 | Frecka | 364/475 |
| 4,260,980 | 4/1981 | Kobayashi et al. | 340/680 |
| 4,326,257 | 4/1982 | Sata et al. | 364/551 X |
| 4,326,287 | 4/1982 | Sata et al. | 364/508 |
| 4,442,494 | 4/1984 | Fromson et al. | 364/474 X |
| 4,456,960 | 6/1984 | Wakai | 364/474 |
| 4,471,444 | 9/1984 | Tee et al. | 364/475 |
| 4,478,538 | 10/1984 | Kakino | 73/104 X |

FOREIGN PATENT DOCUMENTS 2022262 12/1979 United Kingdom .

*Primary Examiner*—Jerry Smith
*Assistant Examiner*—Louis Woo
*Attorney, Agent, or Firm*—C. H. Grace; M. L. Union

[57] ABSTRACT

A method of monitoring the performance of a cutting tool which moves relative to a workpiece through a cycle including the steps of dividing the cycle into a plurality of increments, sensing the function of force applied to the tool during each of the increments, determining and storing the highest function of force and lowest function of force applied to the workpiece during each of the increments, setting a maximum differential function of force limit, calculating the difference between the highest and lowest function of force sensed during each increment and comparing the calculated function of force differential with the set maximum function of force differential and establishing a signal when the calculated function of force differential exceeds the set maximum differential. In the preferred embodiment, the function of force is torque.

23 Claims, 4 Drawing Figures

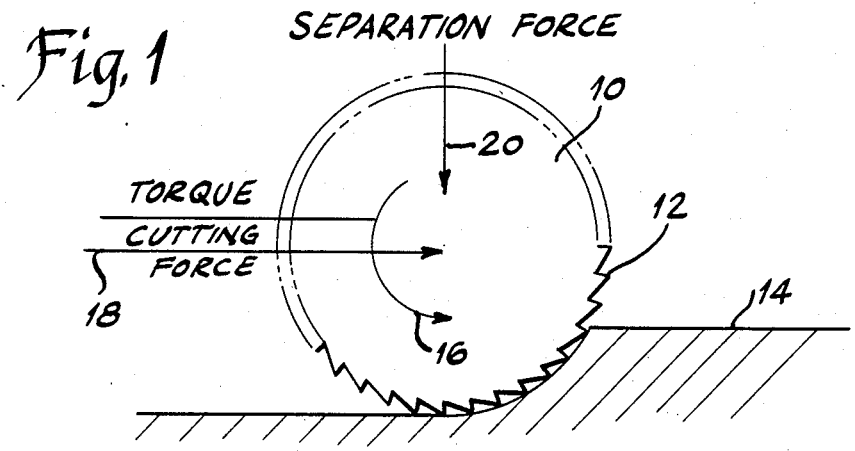
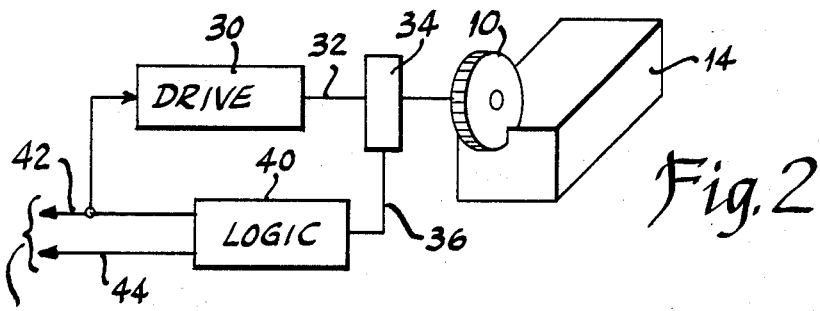
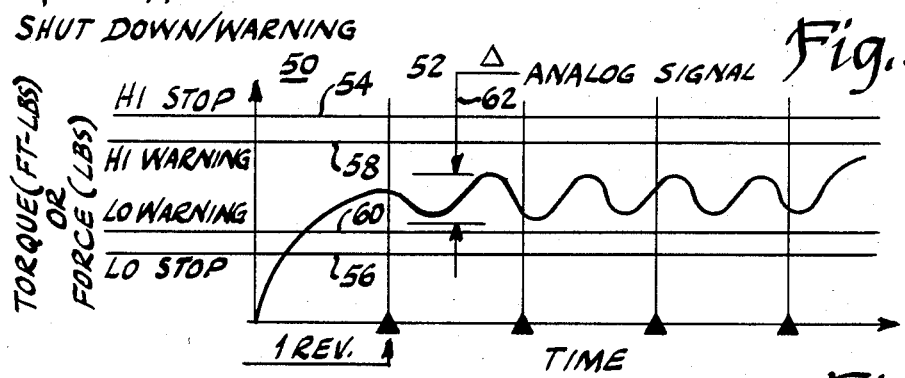
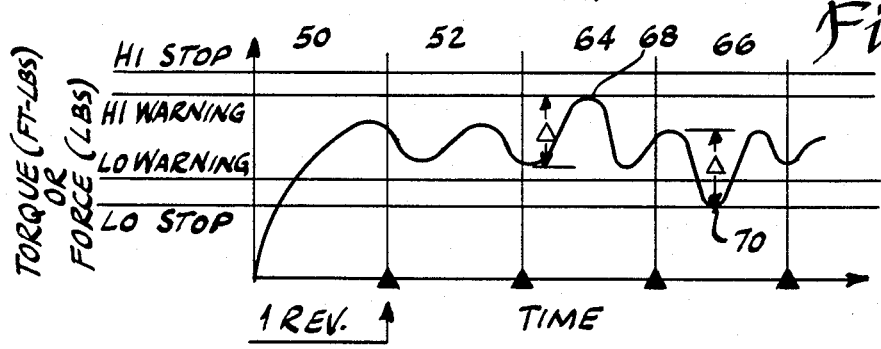

TOOL WEAR SENSORS

BACKGROUND OF THE INVENTION

1. Field of the Invention

The present invention relates to a method of monitoring the performance of a working tool and more particularly to a method of monitoring of the performance of a working tool by sensing differential torque or force associated with the working tool at various points in a work cycle and utilizing the sensed information to determine whether the working tool meets predetermined standards.

Methods of monitoring the performance of working tools are well known in the art. The known methods include sensing torque associated with the working tool and setting a high stop limit when the torque reaches a predetermined magnitude. Another known method includes sensing current or power. However when the current or power of a system is sensed the information is filtered or smoothed by the mass of the system and many significant pieces of information are lost by this smoothing or filtering process.

The known systems do not provide for sensing differential torque during a increment of a work cycle between a working tool and a workpiece. The determination of differential torque can be utilized to determine whether the working tool is functioning properly relative to the workpiece. The differential torque measurement can be utilized to shut down a machine tool if the working tool is not functioning properly such as if the tool is broken or dull and/or can be utilized to activate a warning signal indicating that the cutting tool is getting dull and its replacement time is approaching.

2. Prior Art

The Gilmore et al patent application Ser. No. 398,021 filed July 14, 1982 now U.S. Pat. No. 4,489,617, discloses a quality control method wherein differential torque is utilized to test a mechanical assembly which moves through a cycle. Smith et al does not disclose utilizing differential torque to monitor the condition of a cutting tool.

The Abbatiello U.S. Pat. No. 3,836,834 discloses a machine protection system wherein the system initiates shut down whenever an average force suddenly changes its level by a preselected factor (dynamic error). Abbatiello does not sense torque or force differential but rather produces a dynamic force comparator which is responsive to the average signal output and the instantaneous signal output and which produces a shut down when the instantaneous signal level exceeds a preselected multiple of the average signal level.

The Forath U.S. Pat. No. 3,545,310 runs a high low check but only at a no load level. Forath mainly looks at the torque gradiant to determine tool wear and does not look at dynamic force differential during cutting. Watanabe U.S. Pat. No. 3,834,615 also disclosed a method of monitoring a machine tool wherein the torque gradiant is utilized to sense tool wear.

Frecka U.S. Pat. No. 4,237,408 is an example of a system which assumes that power and torque is indirectly related. Frecka measures power to determine tool wear. Kobayashi U.S. Pat. No. 4,260,986 also assumes that power and torque are directly related and compares high-low power signals with a reference to determine when a bad tool is sensed.

SUMMARY OF THE INVENTION

The present invention provides a new and improved method of monitoring the performance of a tool which moves relative to a workpiece through a cycle. The method includes the steps of dividing the cycle into a plurality of increments, sensing the force or torque applied to the tool during each of the increments, determining and storing the highest and lowest torque applied to the workpiece during each of the increments and setting a maximum torque differential limit for the difference between highest and lowest torque sensed during each increment. The difference between the highest and lowest torque sensed during each increment is compared with the set maximum torque differential limit and a first signal is established when the set maximum differential is exceeded.

Another provision of the present invention is to provide a method of monitoring the performance of a tool as set forth in the preceding paragraph further including the step of setting a low torque limit for the lowest torque sensed during a particular increment and establishing a second signal when the sensed torque is below the set low torque limit.

A further provision of the present invention is to provide a new and improved method of monitoring the performance of a tool as set forth in the preceding paragraph further including the step of setting a high torque limit for the highest torque sensed during a particular increment and establishing a third signal when the sensed torque is above said set high torque limit.

A still further provision of the present invention is to provide a new and improved method of monitoring the performance of a tool as set forth in the preceding paragraph further including the steps of setting a high torque warning limit and a low torque warning limit and comparing the sensed torque with the high torque and low torque warning limit.

DESCRIPTION OF THE DRAWINGS

FIG. 1 is a schematic illustration of a tool moving relative to a workpiece.

FIG. 2 is a schematic illustration of apparatus for performing the method of the present invention which drives a cutting tool through a workpiece and which includes logic for monitoring the forces associated with the cutting tool.

FIG. 3 is a graphical illustration of a normal force or torque curve for a properly performing tool.

FIG. 4 is a graphical illustration of a torque or force curve for a non-properly performing tool.

DESCRIPTION OF THE PREFERRED EMBODIMENT

Referring to FIG. 1 a tool 10 having teeth 12 is disclosed as operating on a workpiece 14. The cutting tool 10 rotates in a counterclockwise direction as viewed in FIG. 1, to remove material from the workpiece 14 in a well-known manner. The present invention contemplates sensing various forces, functions of forces or equivalents thereof associated with the cutting tool 10 to determine whether the cutting tool 10 is properly cutting the workpiece 14. To this end the cutting tool 10 can be instrumented to provide an indication of the torque, separation force, feed force and or cutting force associated with the tool 10. The torque, schematically illustrated by the arrow 16, is the rotational force of the circular motion of the part or cutting tool as its rotates about an axis of rotation. The cutting force, schematically illustrated by the arrow 18 is equivalent to the thrust or force which is required to push the tool 10 into the material 14 to be cut. The separation force, which is schematically illustrated by the arrow 20 is the force which is required to hold the tool in position to keep the tool 10 at the proper depth with respect to the workpiece 14. The feed force, which is not illustrated, would be the force associated with a cutting tool, such as a drill, which is required to move the drill into the workpiece in a direction parallel to the axis of rotation of the drill. For a cutting tool such as a lathe, the feed force would be the force required to feed the workpiece in a linear direction into the cutting tool parallel to the axis of rotation of the workpiece. For planers, shapers, broaches, grinders and extruders, the feed force would be that required to effect relative linear movement between the tool and workpiece as the tool operates on the workpiece. While the present invention will be described as sensing the torque associated with the working tool 10 it should be appreciated that other force related functions such as the separation force, feed force, thrust, pressure or cutting force could be utilized to provide an indication of tool wear or breakage in the present invention. Thus, it is applicant's intention that the terms torque, cutting force, separation force, feed force, thrust and force be used interchangeably throughout the present application and claims and that the sensing of torque also include the sensing of these and various force related functions.

FIG. 2 is a schematic representation of the system for driving the cutting tool 10 relative to the workpiece 14. The system includes a drive 30 which effects rotation of a shaft or spindle 32 which supports the cutting tool 10 for rotation therewith in a well-known manner. While the cutting tool 10 is described as rotating it should be appreciated that relative motion is required between the cutting tool 10 and workpiece 14 and that the workpiece 14 could rotate relative to the cutting tool 10 or could move relative thereto in a linear fashion such as in broaching, grinding, extruding, planning or shaping.

Means are provided for measuring the force or torque applied by the drive 30 between the cutting tool 10 and workpiece 14. In the preferred embodiment, the force measurement is effected by a torque transducer 34 which is utilized to sense the force or torque applied to the spindle 32 by the drive 30. However, it should be appreciated that separation force, feed force, thrust or other force related measurements, as set forth hereinabove, could be utilized to provide a torque or force signal for the present invention. The torque transducer 34 establishes a signal on line 36 which is directed to a logic circuit 40 for controlling the drive 30. The logic circuit 40 is operable to process the torque signal on line 36 to determine whether the cutting tool is functioning properly. The logic circuit 40 can determine whether the cutting tool is bad and can additionally indicate when the cutting tool is dulling and is approaching a time when it must be replaced. The logic circuit 40 is operable to establish a signal on output line 42 to shut down drive 30 whenever a broken or bad tool 10 is sensed. The logic circuit 40 is operable to establish an output signal on line 44 indicative of a worn tool which needs to be changed in the near future.

FIG. 3 disclosed a torque or force signature for a typical cutting tool. The signature illustrated in FIG. 3 is indicative of a cutting tool having a single cutting edge rather than a plurality of cutting teeth 12 as is illustrated in FIG. 1 for simplicity. The cutting tool 10 rotates relative to the workpiece 14 through a cycle. The cycle is divided into a number of predetermined increments which in the preferred embodiment are indicative of a single revolution of the cutting tool 10. A cycle increment may be indicative of a single revolution of the tool 10 or a plurality of revolutions of the tool 10. If a plurality of revolutions is defined as a cycle increment, the plurality of revolutions may be the number of revolutions necesary to complete a part to be machined or may be a percent of a machining cycle for a part, such as one-half or one-third of a machining cycle for a part. An angle-encoder or rotation counter can be incorporated in the torque transducer 34 to establish signals on line 36 to the logic circuit 40 indicative of cycle increments. While a single or a plurality of rotations of the tool 10 has been utilized as a cycle increment in the preferred embodiment, it should be realized that the cycle could be broken into time or distance increments rather than angle increments. For example, in broaching, a LVDT (linear variable differential transformer) could be utilized to divide a cycle into a plurality of distance increments based on the relative linear movement between the broach and the workpiece. FIG. 3 illustrates schematically the first five increments of a cutting cycle wherein each increment is indicative of one revolution of a cutting tool.

During the first increment 50 of the cutting cycle illustrated in FIG. 3 the cutting tool 10 will initially engage with the workpiece 14. The torque or force sensed will gradually increase and may include spikes due to the initial contact between the cutting tool 10 and workpiece 14. In order to eliminate extraneous readings during the first segment a leading edge turn-on function is utilized which basically prevents the logic 40 from processing signals until a certain magnitude of torque has been reached at the beginning of the cycle. The leading edge turn-on function is more fully disclosed in U.S. application Ser. No. 398,021 filed July 14, 1982 and assigned to assignee of the present invention and such application is incorporated herein by reference.

The torque sensed by the torque transducer 34 is compared with various set limits to determine whether the cutting tool 10 is functioning properly. A high stop limit 54 can be utilized. Whenever the sensed torque exceeds the high stop limit the logic 40 will establish a signal on line 42 to shut down drive 30. The high stop limit could be exceeded by a spike in the torque signal or by a torque signal which gradually increases as the tool wears. A low stop limit 56 can also be set. Whenever the torque sensed by the transducer 34 is less than the low stop limit 56 the logic 40 will establish a signal on line 42 to operate to shut down the drive 30. A high warning limit 58 can also be provided. The high warning limit 58 is less than the high stop limit 54 and is in indicative of the fact that the high stop limit 54 is being approached. When the high warning limit is exceeded a signal will be established on line 44 indicative that the time for changing the tool is approaching. A low warning limit 60 can also be set in the logic 40. The low warning limit 60 is greater than the low stop limit 56 and is indicative of the fact that the low stop limit 56 is being approached. When the sensed torque is less than the low warning limit 60 but greater than the low stop limit 56, a signal will be generated by the logic on line 44.

The high warning limit 58 and the low warning limit 60 can be utilized to indicate that the time for replacing a cutting tool 10 is approaching. The logic 40 is operable to establish an output signal on line 44 whenever the high warning limit 58 is exceeded and the high stop limit is not exceeded or when the sensed torque is less than the low warning limit 60 but not less than the low stop limit 56. Output line 44 could, if desired, be divided into two output lines one associated with the high warning limit and one associated the low warning limit if it is desired. When a signal is established on line 44 indicative that the high warning limit 58 has been exceeded or the low warning limit 60 is greater than the torque sensed a warning signal will be generated which can be utilized by the operator to prepare for a tool change. This will allow the operator of a machine tool to procure the necessary tooling to replace the tool 10 before the high stop warning or low stop warning limit is initiated. This will allow for shorter down time of the machine tool by allowing the operator to prepare for a shut down in advance thereof. In addition the warning to change tools will be given to the operator prior to the tool 10 improperly cutting workpieces 14. This will increase the quality of the parts being produced by the machining system and will provide for faster change-over of new tools when it is required.

The logic circuitry 40 also has a differential torque limit set therein. The differential torque limit is a set maximum difference between the highest torque sensed during a particular increment and the lowest torque sensed during that particular increment. The differential torque limit is schematically illustrated in FIG. 3 at 62 during the second increment 52 of the cycle. If the differential torque limit is exceeded either a shut down signal can be established on line 42 to shut down the drive 30 or a warning signal can be established on line 44. It has been found that the differential force limit can be utilized to sense a non-properly performing tool. While the differential torque limit has been disclosed as being set for a particular increment of the cycle of the machine tool it should be appreciated that it could be set for a group of cycles or a plurality of individual cycles depending on the desires of the user.

FIG. 4 illustrates an example of where the set differential torque limit is exceeded by the sensed differential torque for a particular increment. In FIG. 4 segment 64 illustrates the condition where the differential torque limit 62 is exceeded. In this particular instance a positive going spike 68 has occurred. This could be a large increase in torque caused by a binding tooth on the cutting tool. In segment 66 the differential torque limit is exceeded by a negatively going pulse 70 which could be indicative of a missing tooth on a cutting tool. The torque required to turn the cutting tool would significantly decrease when the missing tooth was supposed to engage with the workpiece 14. The logic circuit 40 senses the torque which is applied to the tool 10 during each increment of a work cycle between the workpiece and tool. If the high warning limit 58 is exceeded or the low warning limit 60 is not exceeded a signal will be established on line 44 indicative of a warning condition. If the high stop limit 54 is exceeded or the low stop limit 56 is not exceeded a shut down signal will be established on line 42. The logic 40 will determine and store the highest torque sensed during each increment and will determine and store the lowest torque sensed during that particular increment. The logic 40 will then determine the difference between highest and lowest torque sensed during a particular increment and compare it with a set differential torque limit. If the differential torque limit is exceeded a first signal will be established on line 42 to shut down drive 30.

While the present invention has been illustrated as dividing the cycle between the workpiece 14 and tool 10 into a plurality of increments wherein each increment is indicative of one revolution it should be appreciated that the increments could also be formed as time, distance or angle increments in the cycle or could be indicative of rotation of greater than or less than one revolution. In addition while it has been indicated that torque, force, separation force, feed force, cutting force, and thrust have been used interchangeably it should be appreciated that the pressure, acceleration, velocity, or distance which the tool moves in a predetermined time frame could also be utilized to monitor the operation of the machine tool.

From the foregoing it should be apparent that a new and improved method of monitoring the performance of a tool which moves relative to a workpiece through a cycle has been provided. The method includes the steps of dividing the cycle into a plurality of increments, sensing the torque or force applied to the tool during each of the increments, determining and storing the highest torque applied to the workpiece during each of the increments, determining and storing the lowest torque applied to the workpiece during each of the increments and setting a maximum differential limit for the difference between the highest torque and lowest torque sensed during each increment. The maximum differential limit is compared with a calculated difference between the highest torque and lowest torque sensed during that particular increment. If the set maximum differential torque limit is exceeded a signal is established which is indicative that the differential torque limit has been exceeded.

What we claim is:

1. A method of applying variable torque to drive a tool and monitoring the performance of the tool which moves relative to a workpiece through a cycle by monitoring the variable torque applied to the tool comprising the steps of:

dividing said cycle into a plurality of increments;

sensing the variable torque applied to said tool during at least some of said increments;

determining and storing the highest sensed torque applied to said tool during at least some of said increments;

determining and storing the lowest sensed torque applied to said workpiece during at least some of said increments;

setting a maximum differential torque limit for the difference between the highest torque and lowest torque sensed during at least one particular increment;

calculating the torque differential between the highest torque and lowest torque sensed during said one particular increment; and comparing said calculated torque differential between the highest torque and the lowest torque sensed for said particular increment with said set maximum differential torque limit for said pariticular increment and establishing a first signal when said calculated torque differential exceeds said maximum differential torque limit.

2. A method of monitoring the performance of a tool which moves relative to a workpiece through a cycle as defined in claim 1 further including the steps of;

setting a low torque limit for the lowest torque sensed during a particular increment;
comparing the sensed torque for a particular increment with said low torque limit for that particular increment; and
establishing a second signal when said sensed torque is below said low torque limit for that particular increment.

3. A method of monitoring the performance of a tool which moves relative to a workpiece through a cycle as defined in claim 2 further including the steps of:
setting a high torque limit for the highest torque sensed during a particular increment;
comparing the sensed torque for a particular increment with said high torque limit for that particular increment; and
establishing a third signal when said sensed torque is above said set high torque limit for that particular increment.

4. A method of monitoring the performance of a tool which moves relative to a workpiece through a cycle as defined in claim 3 further including the steps of;
setting a high torque warning limit which is less than said high torque limit for a particular increment;
comparing the sensed torque for a particular increment with said set high torque warning limit for that particular increment; and
establishing a fourth signal when said sensed torque is above said set high torque warning limit for that particular increment.

5. A method of monitoring the performance of a tool which moves relative to a workpiece through a cycle as defined in claim 4 further including the steps of:
setting a low torque warning limit which is greater than said low torque limit for a particular increment;
comparing the sensed torque for a particular increment with said low torque warning limit for that particular increment; and
establishing a fifth signal when said sensed torque is less than said low torque warning limit for that particular increment.

6. A method of monitoring the performance of a tool which moves relative to a workpiece through a cycle as defined in claim 3 further including the steps of:
setting a low torque warning limit which is greater than said low torque limit for a particular increment;
comparing the sensed torque for a particular increment with said low torque warning limit for that particular increment and establishing a fifth signal when said sensed torque is less than said low torque warning limit for that particular increment.

7. A method of monitoring the performance of a tool which moves relative to a workpiece through a cycle as defined in claim 2 further including the steps of:
setting a low torque warning limit which is greater than said low torque limit for a particular increment;
comparing the sensed torque for a particular increment with said low torque warning limit for that particular increment; and
establishing a fifth signal when said sensed torque is less than said low torque warning limit for that particular increment.

8. A method of monitoring the performance of a tool which moves relative to a workpiece through a cycle as defined in claim 2 further including the steps of;
setting a high torque warning limit which is less than said high torque limit for a particular increment;
comparing the sensed torque for a particular increment with said set high torque warning limit for that particular increment; and
establishing a fourth signal when said sensed torque is above said set high torque warning limit for that particular increment.

9. A method of monitoring the performance of a tool which moves relative to a workpiece through a cycle as defined in claim 1 further including the steps of:
setting a high torque limit for the highest torque sensed during a particular increment;
comparing the sensed torque for a particular increment with said high torque limit for that particular increment; and
establishing a third signal when said sensed torque is above said set high torque limit for that particular increment.

10. A method of monitoring the performance of a tool which moves relative to a workpiece through a cycle as defined in claim 9 further including the steps of;
setting a high torque warning limit which is less than said high torque limit for a particular increment;
comparing the sensed torque for a particular increment with said set high torque warning limit for that particular increment; and
establishing a fourth signal when said sensed torque is above said set high torque warning limit for that particular increment.

11. A method of monitoring the performance of a tool which moves relative to a workpiece through a cycle as defined in claim 10 further including the steps of:
setting a low torque warning limit which is greater than said low torque limit for a particular increment;
comparing the sensed torque for a particular increment with said low torque warning limit for that particular increment; and
establishing a fifth signal when said sensed torque is less than said low torque warning limit for that particular increment.

12. A method of monitoring the performance of a tool which moves relative to a workpiece through a cycle as defined in claim 1 wherein said step of dividing said cycle into a plurality of increments comprises dividing said cycle into a plurality of increments wherein each increment is indicative of a predetermined amount of relative rotation between said workpiece and said tool.

13. A method of monitoring the performance of a tool which moves relative to a workpiece through a cycle as defined in claim 1 wherein said step of dividing said cycle into a plurality of increments comprises dividing said cycle into a plurality of increments wherein each increment is indicative of a predetermined amount of relative linear movement between said workpiece and said tool.

14. A method of applying variable torque to drive a tool and monitoring the performance of the tool which moves relative to a workpiece through a cycle by monitoring the variable torque applied to the tool comprising the steps of:
dividing said cycle into a plurality of increments;
sensing the variable torque applied to said tool during at least some of said increments;
setting a high torque warning limit indicative of a high permissible torque to be sensed during a particular increment;
setting a low torque warning limit indicative of a minimum permissible torque to be sensed during a particular increment;

comparing said sensed variable torque with said set high warning limit and said set low warning limit;

establishing a first signal when said sensed torque exceeds said high torque warning limit and establishing a first signal when said low torque warning limit is not exceeded by said sensed torque.

15. A method of monitoring the performance of a cutting tool which rotates relative to a workpiece through a cycle as defined in claim 14 further including the steps of:

setting a minimum torque low torque limit indicative of the lowest permissible torque to be sensed during a particular increment which would be indicative of an acceptable monitored performance of the tool during said particular increment;

comparing the sensed torque with said set minimum torque limit; and establishing a second signal when said sensed torque is less than said minimum torque limit.

16. A method of monitoring the performance of a cutting tool which rotates relative to a workpiece through a cycle as defined in claim 15 further including the steps of:

setting a maximum torque high limit indicative of the highest permissible torque to be sensed during a particular increment which would be indicative of an acceptable monitored performance of the tool during said particular increment;

comparing said sensed torque with said set maximum torque high limit; and establishing a third signal when said sensed torque is greater than said maximum torque high limit.

17. A method of applying a variable force to drive a tool and monitoring the performance of the tool which moves relative to a workpiece through a cycle by monitoring the variable force applied to the tool comprising the steps of:

dividing said cycle into a plurality of increments;

sensing a function of the variable force applied to said tool during at least some of said plurality of increments;

determining and storing the highest sensed function of force applied to said tool during at least some of said plurality of increments;

determining and storing the lowest sensed function of force applied to said workpiece during at least some of said plurality of increments;

setting a maximum differential function of force limit for the difference between the highest function of force and lowest function of force sensed during at least one particular increment;

calculating the difference between the highest function of force and lowest function of force sensed during said one particular increment; and comparing said calculated function of force differential for said particular increment with said set maximum differential function of force limit for said particular increment and establishing a first signal when said calculated function of force differential exceeds said maximum differential function of force limit.

18. A method of monitoring the performance of a tool which moves relative to a workpiece through a cycle as defined in claim 17 further including the steps of;

setting a low function of force limit for the lowest function of force sensed during a particular increment;

comparing the sensed function of force for a particular increment with said low function of force limit for that particular increment and; and establishing a second signal when said sensed function of force is below said low function of force limit for that particular increment.

19. A method of monitoring the performance of a tool which moves relative to a workpiece through a cycle as defined in claim 18 further including the steps of:

setting a low function of force warning limit which is greater than said low function of force limit for a particular increment;

comparing the sensed function of force for a particular increment with said low function of force warning limit for that particular increment; and and establishing a fifth signal when said sensed function of force is less than said low function of force warning limit for that particular increment.

20. A method of monitoring the performance of a tool which moves relative to a workpiece through a cycle as defined in claim 17 further including the steps of:

setting a high function of force limit for a particular increment;

comparing the sensed function of force for a particular increment with said high function of force limit for that particular increment; and and establishing a third signal when said sensed function of force is above said set high function of force limit for that particular increment.

21. A method of monitoring the performance of a tool which moves relative to a workpiece through a cycle as defined in claim 20 further including the steps of;

setting a high function of force warning limit which is less than said high function of force limit for a particular increment;

comparing the sensed function of force for a particular increment with said set high function of force warning limit for that particular increment; and establishing a fourth signal when said sensed function of force is above said set high function of force warning limit for that particular increment.

22. A method of monitoring the performance of a tool which moves relative to a workpiece through a cycle as defined in claim 17 wherein said step of dividing said cycle into a plurality of increments comprises dividing said cycle into a plurality of increments wherein each increment is indicative of a predetermined amount of relative rotation between said workpiece and said tool.

23. A method of monitoring the performance of a tool which moves relative to a workpiece through a cycle as defined in claim 17 wherein said step of dividing said cycle into a plurality of increments comprises dividing said cycle into a plurality of increments wherein each increment is indicative of a predetermined amount of relative linear movement between said workpiece and said tool.

* * * * *